Dec. 30, 1930.   K. TESSKY   1,786,875
SAFETY DEVICE FOR CAM CONTROLLED MECHANISMS
Filed Nov. 26, 1927
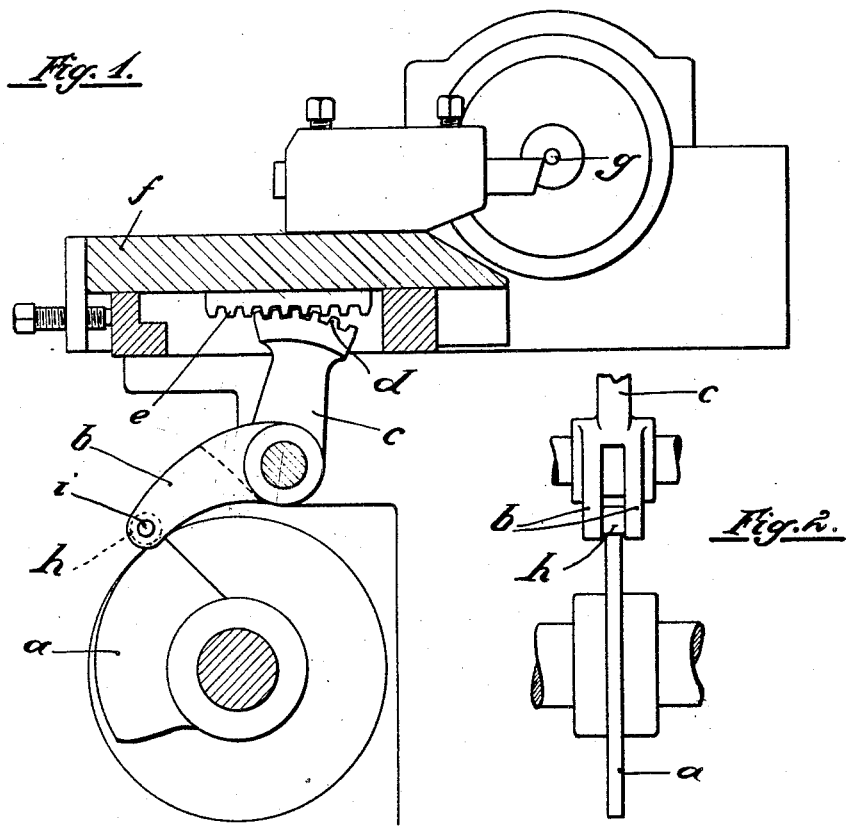
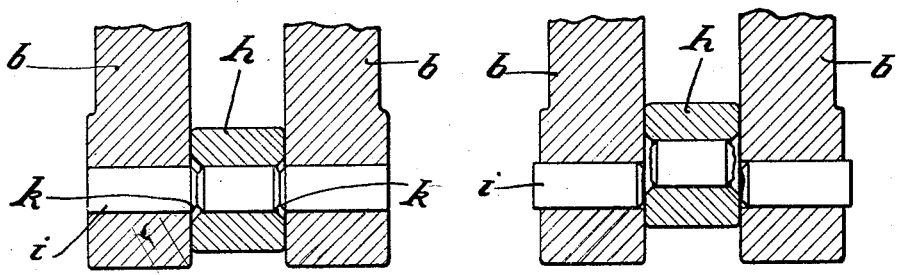

Patented Dec. 30, 1930

1,786,875

UNITED STATES PATENT OFFICE

KARL TESSKY, OF ESSLINGEN-ON-THE-NECKAR, GERMANY

SAFETY DEVICE FOR CAM-CONTROLLED MECHANISMS

Application filed November 26, 1927, Serial No. 235,906, and in Germany December 24, 1926.

My invention relates to cam-controlled mechanisms. It is an object of my invention to provide a safety device for preventing destruction of such mechanisms which will work under all conditions, in contradistinction to safety devices heretofore used which are liable to fail under certain conditions.

To this end I provide a safety device of the shearing type at the point where the cam engages the mechanism which it controls, that its, at the pin or roller by which the cam transmits its movement to the mechanism. In a preferred embodiment of my invention I so design the pin of the roller at the end of the cam-engaging rocking lever that it will be sheared off under abnormal stress.

My invention is particularly designed for cam drives in machine tools but I do not desire to be limited to this field as the device will prove useful in connection with other cam drives.

In automatic and semi-automatic machine tools, cams cooperating with rocking levers are frequently provided for imparting movements of the desired character and extent to tools and other parts. When the cutting edge of a tool breaks or becomes blunt the resistance to the feed movement of the tool becomes excessive and exerts a corresponding reaction on the cam drive. The same occurs if an obstruction, for instance, a part which has been finished but sticks in the machine instead of being ejected, gets into the way of a moving part so as to interfere with its movement. In such cases the rocking lever or other vital parts of the machine are liable to be broken or damaged and considerable delay will be inevitable.

It has already been proposed to eliminate trouble due to this cause by providing a belt for operating the cam, this belt being free to slip in the case of excessive resistance so as to prevent serious damage, but this expedient is not reliable under all conditions and will fail if accidentally at the time, when a disturbance arises, the leverage of the cam and the rocking lever is considerable, that is, when the cam lever bears on a gradually rising portion of the cam, as then the torque which the belt transfers is quite small. It has been attempted to overcome this drawback by providing separate shearing appliances but this involves the provision of special parts with corresponding increase of initial cost and size of the machine.

These drawbacks are eliminated according to my invention by specially designing a part of the machine which is required under all conditions, without involving increase of cost and size by providing separate means. The part thus designed is readily replaced after having performed its function, that is, after having been sheared off by any unskilled person, being of simple construction and in contradistinction to the special appliances referred to which are enclosed in the machine, is disposed at a point which permanently projects from the machine and therefore is readily accessible.

The pin at the outer end of the rocking lever is recessed so that its section is reduced and the pin will be sheared off under a predetermined stress, the reduced area being so calculated that dangerous loads cannot be exerted on any part of the mechanism.

In the drawings affixed to this specification and forming part thereof a device embodying my invention is illustrated diagrammatically by way of example as adapted to the carriage of a lathe.

In the drawings

Fig. 1 is an elevation, partly in section, of the cam drive,

Fig. 2 is a part end elevation of the drive, viewed from the left in Fig. 1,

Figs. 3 and 4 are axial sections of the roller at the end of the rocking lever, at a larger scale, showing its pin before and after shearing.

Referring to Figs. 1 and 2, $a$ is a cam on a shaft carried in the frame of a lathe to which rotation is imparted by suitable means (not shown) and $b$, $c$ is the rocking lever which cooperates with the cam. The lever is here shown as an angle lever the upper arm $c$ of which is provided with a sector $d$ engaging a rack $e$ in the carriage $f$. $g$ is the work piece which is being machined by a tool in a suitable post on the carriage. $h$ is a roller inserted in the forked outer end of the lever arm $b$ and rotatably carried on a pin $i$ in the eye of the fork on which it makes a running fit. $k$ are recesses made in the pin $i$ where the roller $h$ is seated. The recesses should extend as far as the inner faces of the fork but preferably project slightly into its eyes. Preferably the recess is V-shaped in section and the hole in the roller $h$ is flared at both ends.

When an obstruction against the reciprocation of the carriage $f$ occurs and the stress oversteps the limit to which the reduced sections of the pin $i$ at the recesses $k$ have been calculated, the pin is sheared through before any parts of the machine are subjected to undue loads.

The point where the failure occurs is in a convenient position so that the pin $i$ is readily replaced.

The flarings at the ends of the hole in the roller $h$ have for their object to prevent damage to the forked end of the lever $b$ by the broken parts of the pin $i$.

Referring to Fig. 4, it will appear that the flared ends of the hole act on the conical walls of the recesses $k$ in the manner of wedges, pushing the broken ends of the pin $i$ out of the way on which the roller is receding in the fork. The fractured faces of the part of the pin $i$ which is removed with the roller $h$ are concealed within the roller and cannot exert any detrimental action on the inner faces of the fork.

I wish it to be understood that I do not desire to be limited to the exact details of construction shown and described for obvious modifications will occur to a person skilled in the art.

I claim:—

The combination of a rotary cam, a lever having one arm provided with a terminal fork, a pin extending transversely of the space between the members of said fork, a roller mounted on said pin within the fork so as to be engaged by its members at either end and projecting from the lever into the path of the cam, so that normally the lever will be rocked at each rotation of the cam, the roller supporting pin having two annular grooves formed therein and so related that both grooves are within the bore of the roller, with tapering surfaces extending from the lowest point of each groove to the adjacent end of the bore in said roller, substantially as and for the purpose described.

In testimony whereof I affix my signature.

KARL TESSKY.